Sept. 29, 1970 H. DISCRY 3,531,273
METHODS FOR THE PRODUCTION OF RIBBED GLASS SHEETS
Original Filed Sept. 13, 1965 18 Sheets-Sheet 1

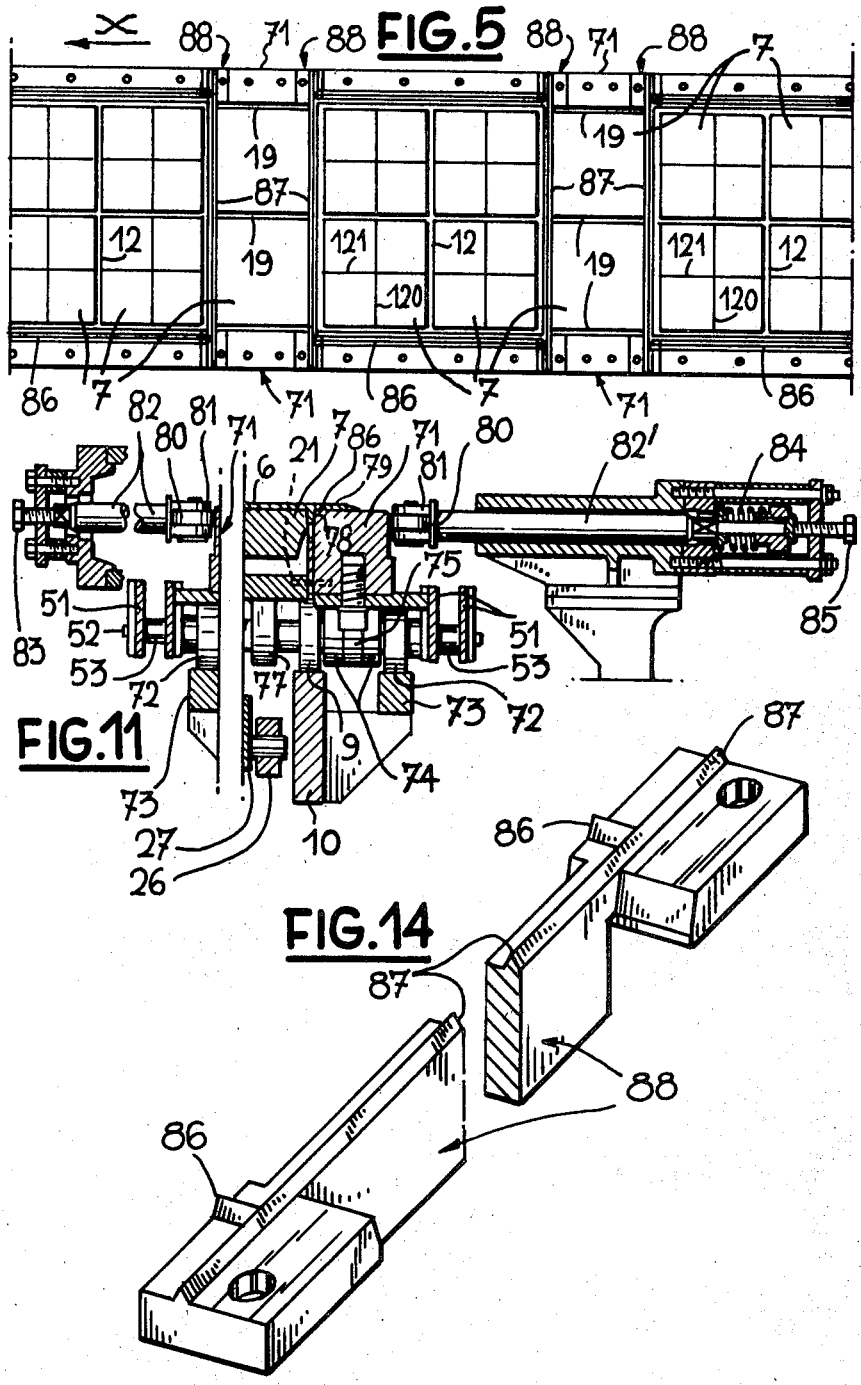

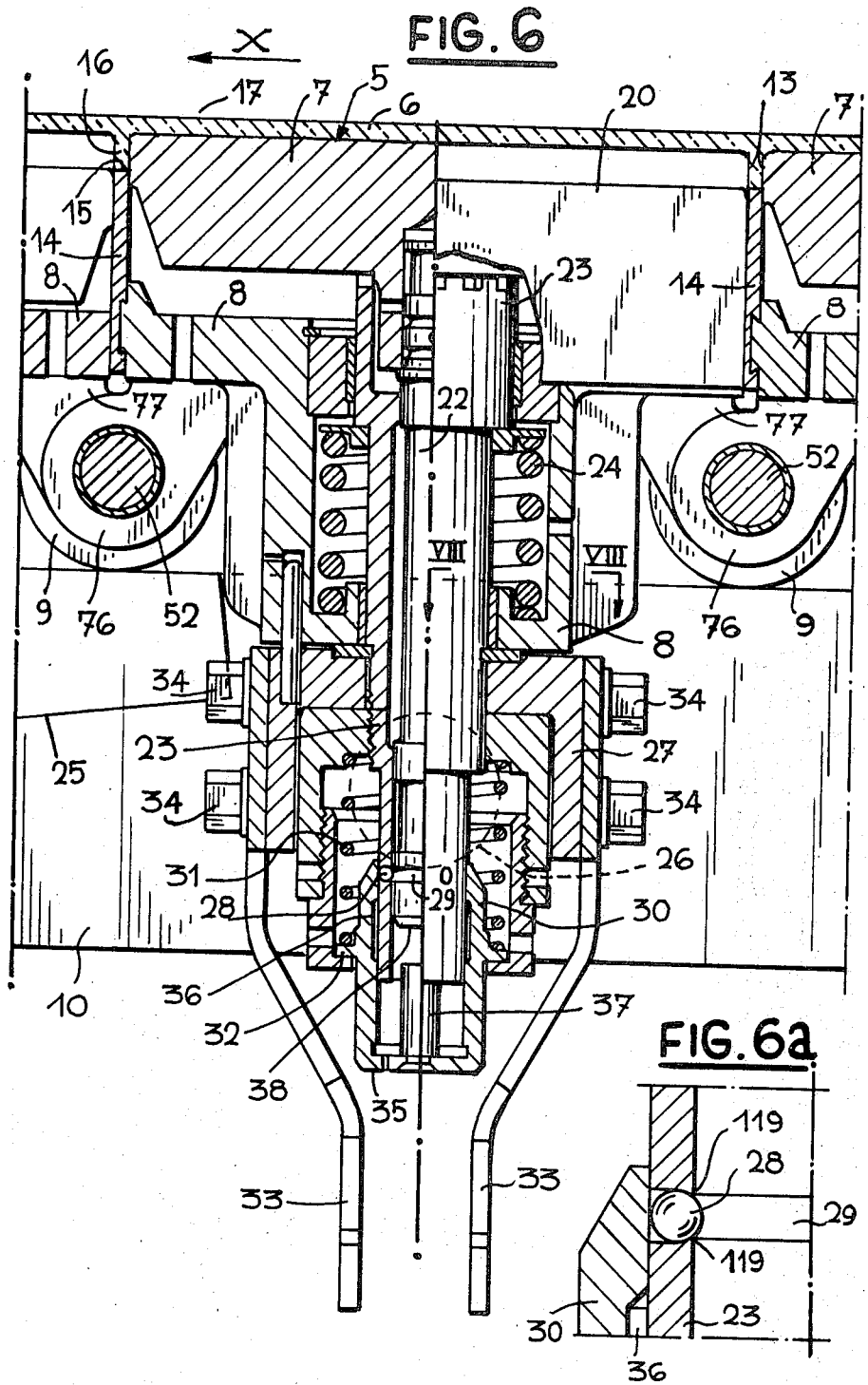

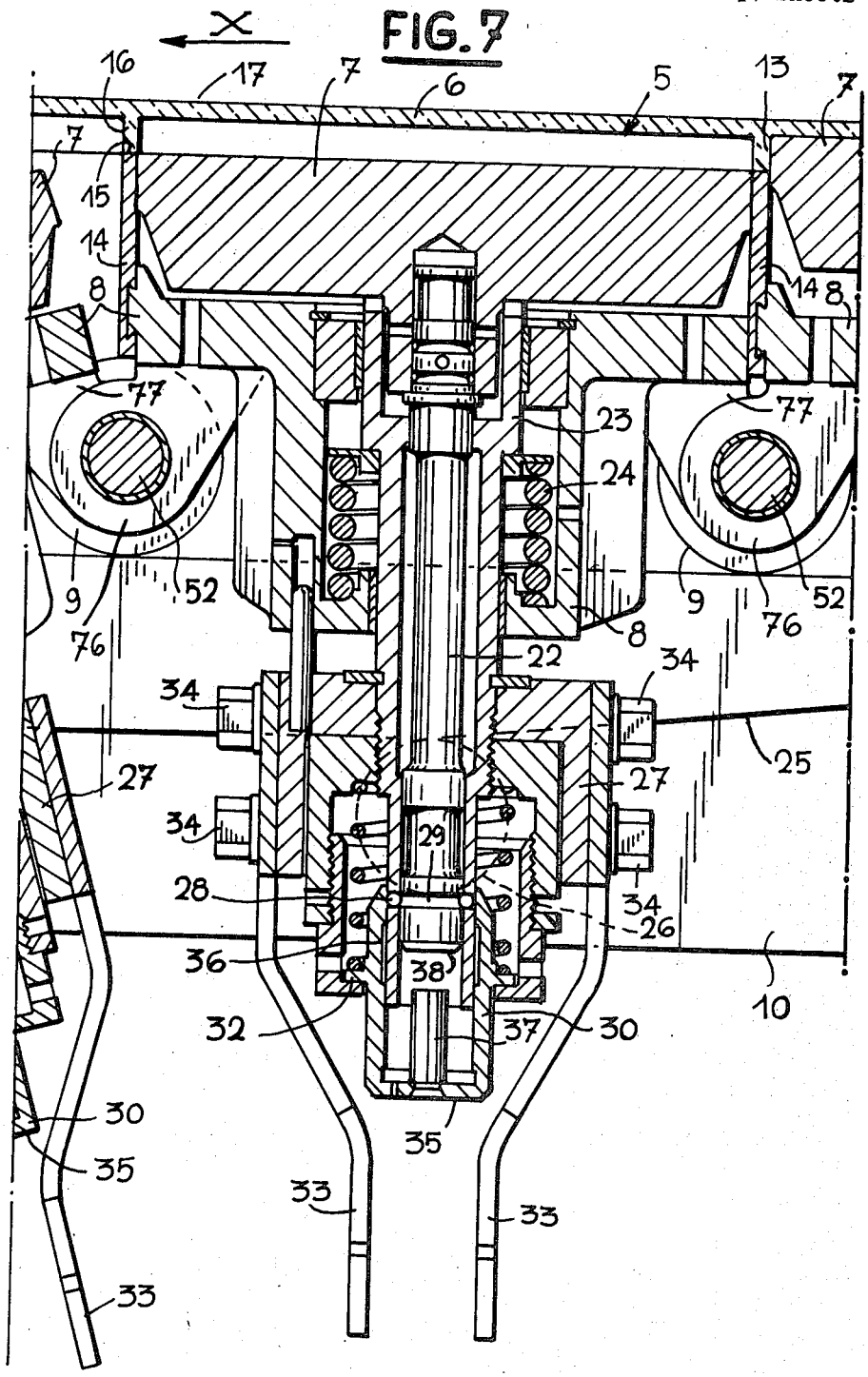

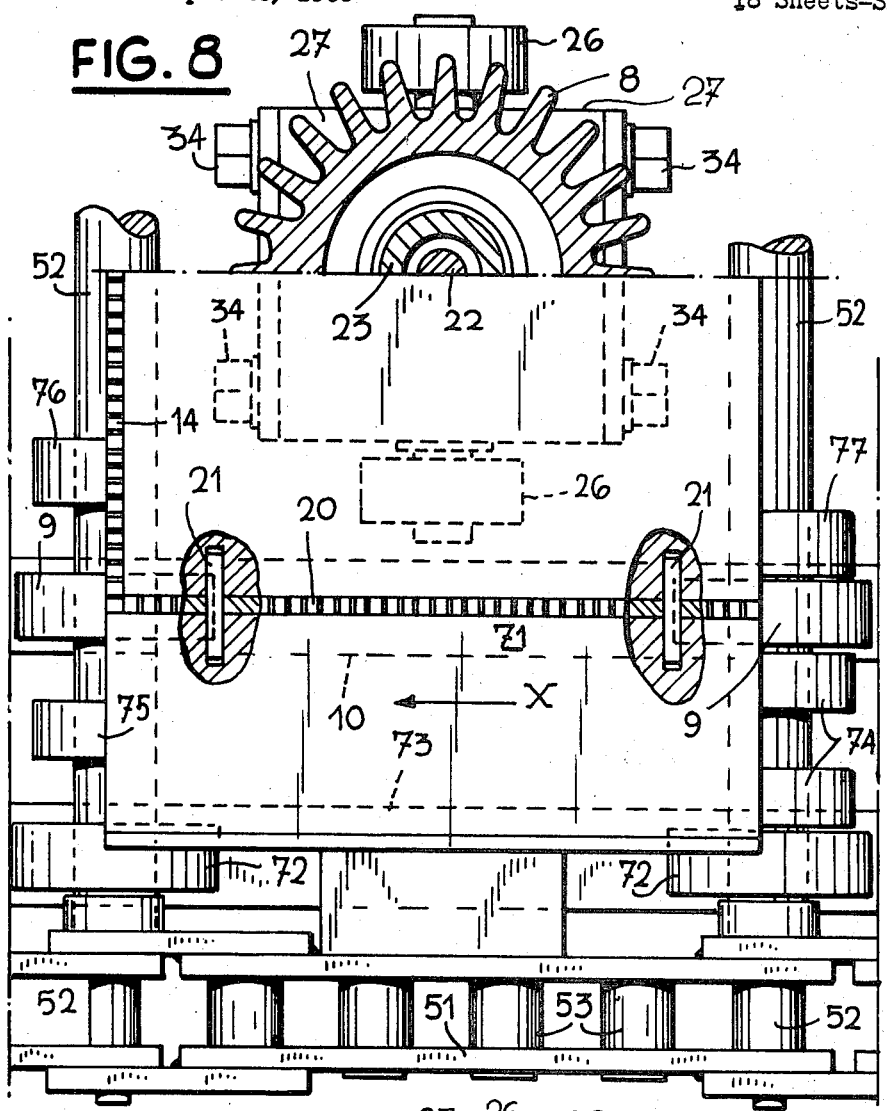
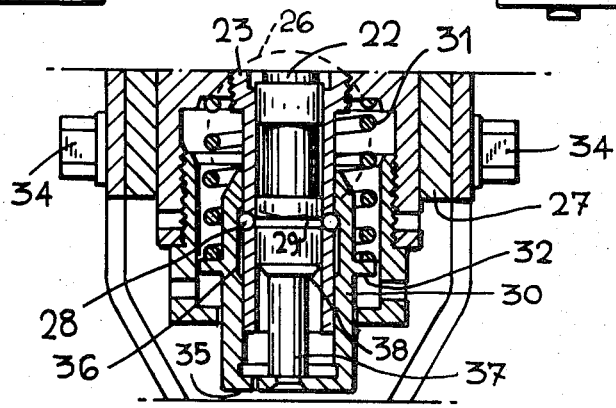

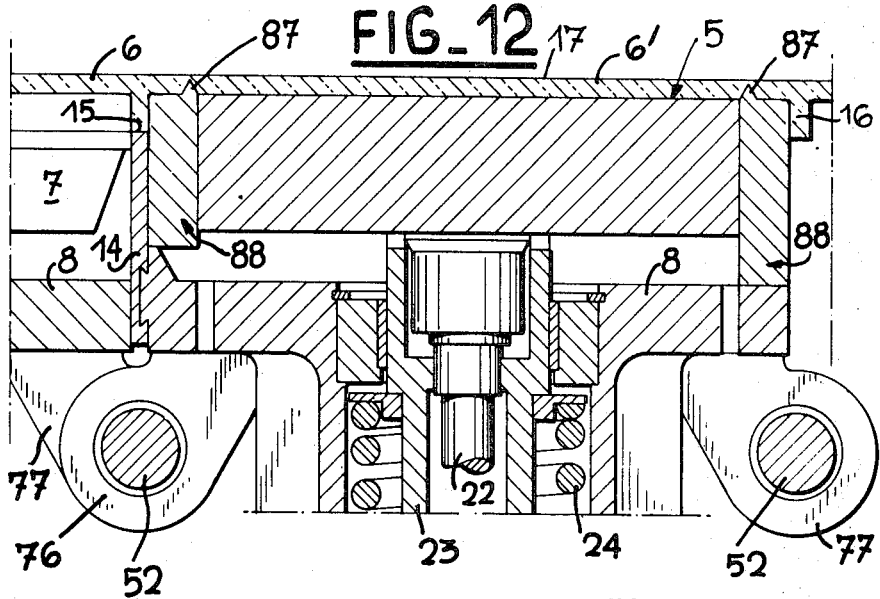
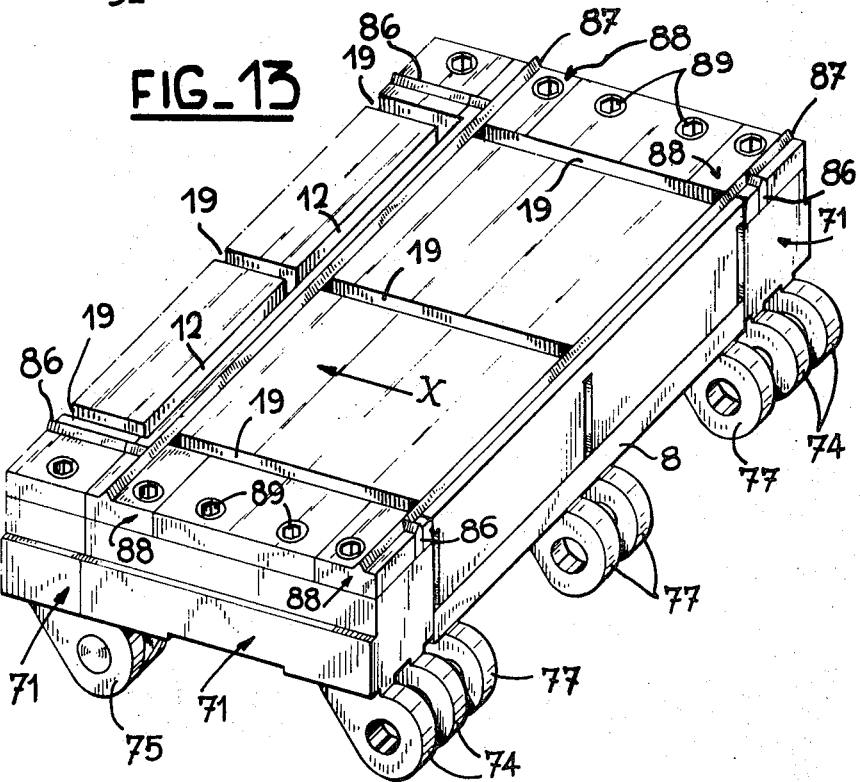

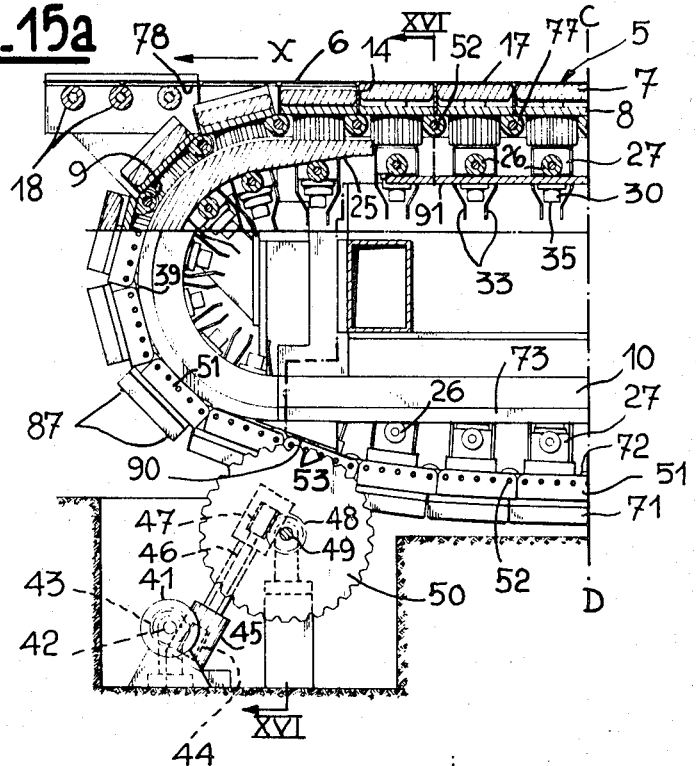
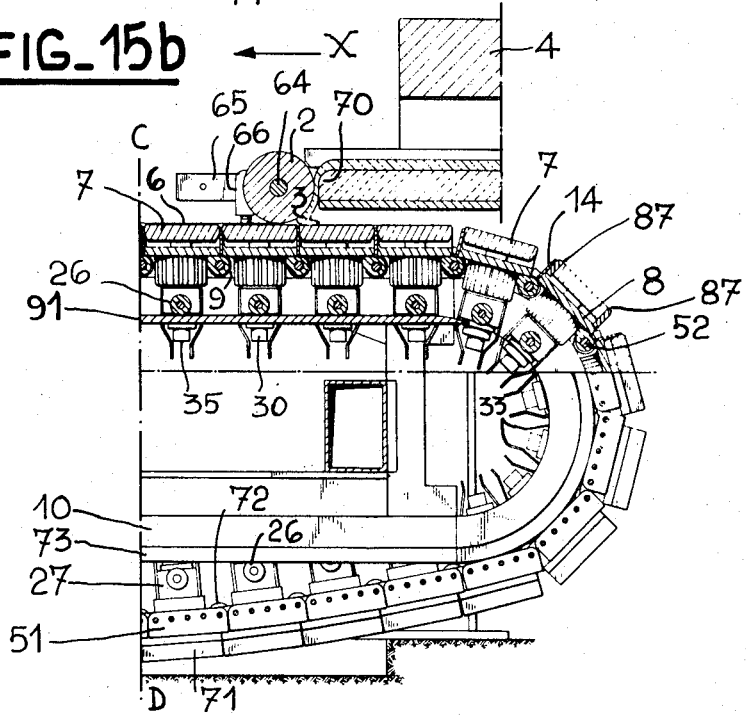

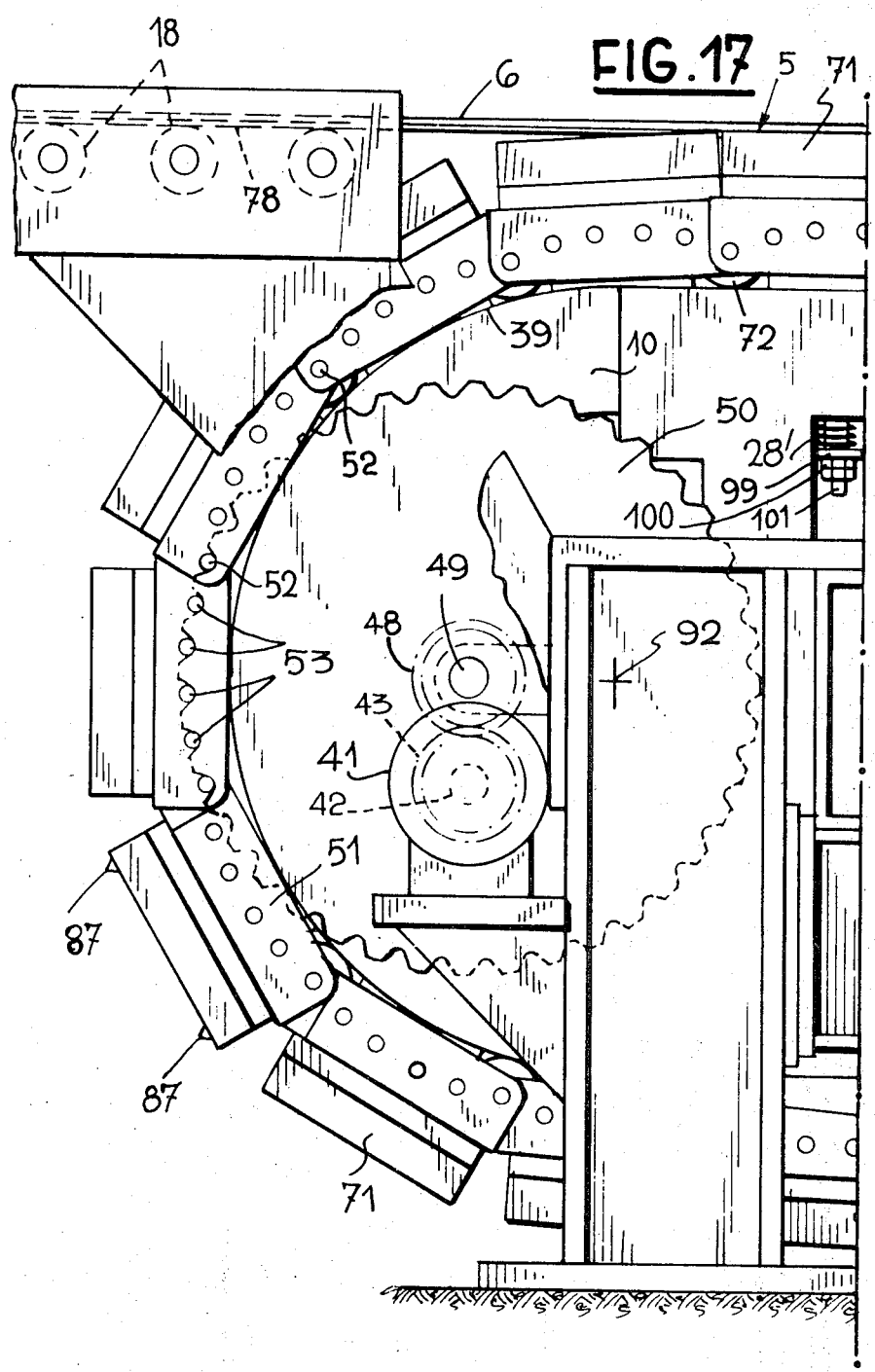

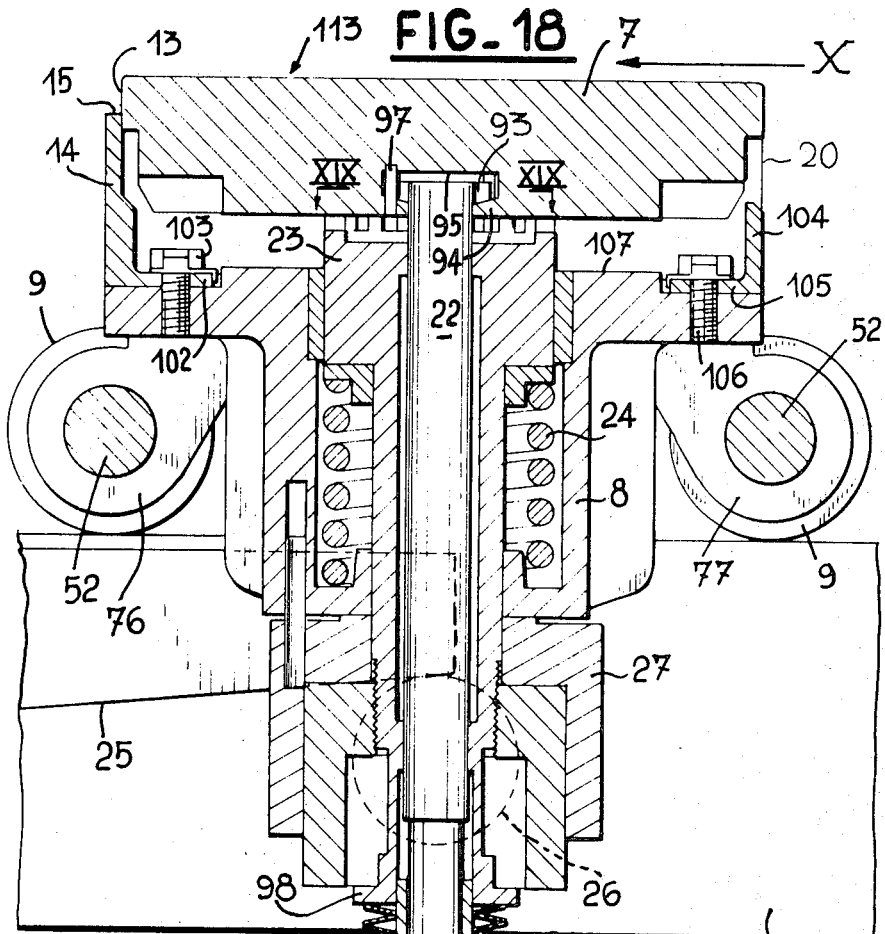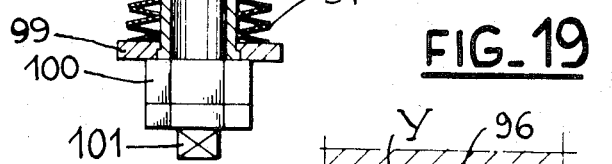

Sept. 29, 1970  H. DISCRY  3,531,273
METHODS FOR THE PRODUCTION OF RIBBED GLASS SHEETS
Original Filed Sept. 13, 1965  18 Sheets-Sheet 18

United States Patent Office 3,531,273
Patented Sept. 29, 1970

3,531,273
METHODS FOR THE PRODUCTION OF RIBBED GLASS SHEETS
Henri Discry, Ixelles, Belgium, assignor to Glaverbel, Brussels, Belgium
Original application Sept. 13, 1965, Ser. No. 486,732, now Patent No. 3,459,525. Divided and this application Apr. 24, 1969, Ser. No. 818,959
Claims priority, application Luxemburg, Sept. 17, 1964, 46,970
The portion of the term of the patent subsequent to Aug. 5, 1986, has been disclaimed
Int. Cl. C03b 13/08
U.S. Cl. 65—94                                                7 Claims

ABSTRACT OF THE DISCLOSURE

A method for the production of sheets of glass having at least one surface with ribs wherein molten glass is passed between a rotary roller and a spaced advancing surface having grooves therein such that the molten glass is forced into the grooves to form a sheet with ribs extending into the grooves, thereafter moving the advancing surface away from the sheet while temporarily supporting the ribs and then engaging the sheet at a location where it has solidified to remove the sheet.

CROSS-RELATED APPLICATION

This application is a division of my earlier filed application Ser. No. 486,732 filed Sept. 13, 1965 and now issued as U.S. Pat. No. 3,459,525.

DETAILED DESCRIPTION

This invention relates to methods for the production of sheets of glass at least one surface of which is provided with ribs. More particularly, the invention is directed to methods of the above type in which a roller forces molten glass into grooves formed in a moving support advancing at a distance from the roller which is equal to the thickness of the sheet to be produced.

Apparatus for carrying out this method is known in which the moving or mobile support comprises a roller having longitudinal and transverse grooves. In this apparatus, a second roller forces the molten glass into the grooves so that transverse and longitudinal ribs are formed in the sheet of glass emerging from the outlet of the rollers. The ribbed sheet of glass is then carried towards an annealing chamber by conveyor rollers possibly after its heating in order to allow the welding of its ribs to a smooth sheet which is brought into contact with the ribbed sheet immediately after its production.

This process is only applicable for the production of ribbed sheets whose ribs are of a height not exceeding a few millimeters, for instance four millimeters. As the transverse ribs of the sheet free themselves from the longitudinal groove of the grooved roller, immediately after having been formed in this roller, the ribs move forward with the sheet at a speed equal to the peripheral speed of the grooved roller while the speed of rotation component of the grooves in the direction of feed of the sheet decreases more and more. The disengagement of rectangular transverse ribs is therefore only possible if their height is kept small. If their height was high it would be necessary to give them a trapezoidal form whose large base is very much larger in comparison with its parallel shorter side. Furthermore, the longitudinal ribs of the sheet of glass formed in the transverse grooves of the grooved roller are subjected to deformation because their head in contact with the bottom of the grooves advances at a speed which is less than the speed of forward feed of the sheet formed, this latter speed being equal to the peripheral speed of the part of the grooved roller comprised between the transverse grooves. These deformations of the longitudinal ribs increase in proportion with increase in height of the ribs and there is even a risk of tearing the glass which has cooled on contact with the grooved roller.

This drawback does not exist when, in order to form small square glass pieces designed for use in mosaic covering of about two millimeters thickness, hot glass is rolled by means of a smooth roller on an endless table provided with cutters of triangular section which are at right angles with one another, which embed themselves in the sheet of glass through practically its whole thickness in order that after cooling of the sheet, the thin layer of glass which exists at the bottom of the grooves separating the squares can easily be crumbled leaving only the desired squares of glass.

According to the present invention there is provided a method by which it is possible to produce a sheet of glass provided with ribs whose surfaces are substantially parallel, whatever the height of the ribs.

The invention is characterized in that the above-mentioned mobile support is an endless rolling table formed by at least one set of successive shoes which are driven by interarticulated carriages rolling on guides, transverse grooves being provided in the rolling table between the upper portions of the shoes and means are provided to remove these shoes from the glass sheet at the point where it is desired to effect removal from the mould.

In the case where the rolling table comprises several juxtaposed sets of successive shoes, longitudinal grooves corresponding to the width of longitudinal ribs to be produced in the sheet are provided between the upper parts of the shoes of the different juxtaposed sets.

The transverse or longitudinal grooves are, for example, formed in the edges of the shoes.

In a more advantageous form, the bottom of the grooves is formed by the upper part of metal sheets mounted on the carriages, between the shoes, and supporting the glass sheet while the shoes are removed from it. Since the shoes constituting the roller table are removed from the glass sheet and free the ribs before inclining in relation to them, the likelihood of the transverse ribs being broken during removal from the mould is removed. Furthermore because of the fact that a transverse rib already removed from the mould on one side continues to be supported by the metal sheets mounted on the carriages while it is removed from mould on the other side, the part of the sheet of glass situated above the shoes which are being removed from its continues likewise to be supported in front of the shoes during the removal from mould and there is no danger for this part to be broken.

According to an advantageous feature, the above-mentioned metal sheets are mounted so as to be removable. It is then possible to manufacture with ease, glass sheets whose ribs are of different heights.

In a special form of embodiment each of the said shoes is supplied on a central sleeve which is perpendicular to its upper surface and which slides axially in the corresponding carriage. Furthermore, a spring biasses the said sleeve so as to urge the shoe which this sleeve carries from the carriage which entrains it until it is in a position where the upper surface of the shoe comes into position for the formation of the glass sheet. Finally, the sleeve can slide against the action of the above-mentioned spring under the control of a fixed cam associated with removal of the sheet from the mould when rollers carried by a movable fitting mounted on the sleeve contact the fixed cam during the forward feed movement of the shoes.

Because the control of removal from mould is transmitted through the central sleeve, there is no danger of wedging of the shoe as it is removed from the sheet.

In another special form of embodiment, each of the above-mentioned shoes is held against a sleeve whose axis is perpendicular to its upper surface, by means of an intermediate rod which slides in the sleeve and which is subjected to the action of a return spring in the direction corresponding to the application of the shoe on the sleeve. Furthermore, each sleeve slides in the corresponding carriage and is biassed by a spring so as to remove from the carriage the shoe which is applied to it, until the said shoe occupies a position in which its upper surface comes into position for the formation of the glass sheet. Finally, each sleeve is rendered integral with a mobile fitting provided with rollers which, rolling on a rolling path, keep the corresponding shoe in the position in which it comes into position for the formation of the glass sheet and which, rolling on a fixed cam associated with removal from mould after having left this rolling path, bring the upper surface of the shoe nearer the carriage, the said cam associated with removal of the sheet from the mould acting on the shoe against the action of the spring which tends to remove it from the carriage, when this latter reaches the spot at which removal of the sheet from the mould takes place.

It is also advantageous either to have each shoe carried by an intermediate rod which can slide in the above-mentioned sleeve but which, in the working position of the shoe, is rendered integral with the sleeve by means of removable locking means, or of mounting each rod in such a way that it can be released from the shoe which it applies against the sleeve of the mobile fitting. It is then easily possible to remove each shoe if it is wished to replace it by another.

If furthermore, the shoes are of a square form, it is possible to use shoes having decorative motifs or grooves and to orient these motifs or grooves in two directions at right angles to one another. In fact when their rod has been released from the corresponding mobile fitting or when they have been released from their rod, it is sufficient to turn them through 90° to be able to bring them again to occupy the same position in the rolling table.

According to another feature of the apparatus in accordance with the invention, in the case where the rolling table comprises several adjacent sets of successive shoes carried by carriages, the successive pairs of carriages arranged side by side in the juxtaposed sets are articulated around a common pivot.

It is then these common pivots which provide an articulation system for the links of the endless chains driving the carriages, each of these links having rollers between the common pivots to take up the thrust of driving sprockets.

These sprockets may engage the endless chains at different points in different forms of embodiment.

If the driving sprockets are arranged below the upper sides of the endless chains and actuate links forming part of these sides, the links of the chains actuated by the sprockets are advantageously repelled towards them by rollers biassed by springs which compensate the radial components of oblique thrusts exerted by the teeth of the sprockets on the driving rollers of these links.

If the driving sprockets are arranged below the lower sides of the endless chains, they are made to engage links which are applied against guides substantially oriented along the tangent of circular guides on which the carriages roll between the upper side and the lower side of the rolling table.

These guides of the links placed tangentially to the circular guides at the outlet point of these latter completely prevent any recoil of the chains at the moment when the successive teeth of the sprockets come into contact with the rollers carried by the links.

If the driving sprockets are so arranged that their axes of rotation are substantially at the same level as the centers of the circular guides on which the carriages roll passing from the upper side to the lower side of the rolling table, the axes of the intermediate rollers of each link are arranged along an arc of circumference which is concentric to the above-mentioned circular guides when the carriages roll on these circular guides.

In order to adapt the flow of the glass to the quantity of glass required for the formation of the glass sheet, there is provided means for controlling the distance between the roller and an overflow chute along which the molten glass flows towards the rolling table.

For this purpose it is specially provided that the rotary roller forcing the molten glass into the grooves of the rolling table, shall be mounted on a slide member which is movable in the direction of forward feed of the table and whose working position can be adjusted.

In order to be able to produce continuously a ribbed glass sheet having constant width, there is also provided cutters on some of the abovementioned shoes extending parallel to the longitudinal direction of the rolling table and aranged in such a way as to separate the marginal strips of the sheet from its central strip at the point where the hot glass is pressed on the rolling table by the above-mentioned rotary roller.

Preferably, the above-mentioned longitudinal cutters come almost in contact with idle rollers mounted at the ends of the above-mentioned rotary roller.

In an advantageous form of embodiment these idle rollers are coaxial with the rotary roller and have a diameter greater than that of the roller.

In order to be able to continuously produce a set of ribbed glass plates, some of the above-mentioned shoes have cutters arranged transversely to the longitudinal direction of the rolling table in such a way as to cut the glass sheet, at least substantially through its entire thickness, at the point where the hot glass is pressed on the rolling table by the above-mentioned rotary roller.

Other features and details of the invention will appear in the course of the description of the drawings attached to this specification, which represent diagrammatically and solely by way of example, several embodiments of the apparatus in accordance with the invention.

FIG. 2 is a cross-sectional view taken along line II—II in FIG. 1a.

FIG. 4 is a sectional view as taken along line IV—IV in FIG. 3a.

FIG. 5 represents diagrammatically in plan a part of the rolling table forming part of the apparatus in accordance with the invention.

FIG. 6 is a vertical section at a part of the rolling table at the point preceding removal from mould, this section being in the axis of a shoe, part of which has been removed.

FIG. 6a represents a part of FIG. 6 on a larger scale.

FIG. 7 is a vertical section of the rolling table at the point where the removal from mould has just been effected this section being taken in the axis of a shoe.

FIG. 8 is, partly broken away, a part section at the level of the line VIII—VIII in FIG. 6 and a plan view of part of the rolling table in accordance with the invention showing certain details of one of the drive chains of this table, the articulation between the successive carriages and the transverse connection between the adjacent sets of shoes.

FIG. 9 is a vertical section similar to that in FIGS. 6 and 7, showing another position of the ring which, in this last figure, assists in licking the rod of a shoe in relation to the sleeve in which this rod is arranged.

FIG. 11 is a cross-section, partly broken away, at the point where there is a device designed to keep the different sets of shoes and carriages in contact with one another in the desired alignment for the rolling table.

FIG. 12 is a longitudinal section in the central part of the rolling table carrying transverse cutters, this section being taken along the line XII—XII in FIG. 5.

FIG. 13 is a perspective view of the part of the rolling table where these transverse cutters are arranged.

FIG. 14 is a perspective view, partly broken away, of a component carrying a transverse cutter.

FIG. 15a is a longitudinal section as taken along the line XV—XV in FIG. 16, showing another arrangement of the driving mechanism causing the rolling table to move forward in the part of an apparatus situated to the left of a line C–D.

FIG. 15b is a longitudinal section of the part of the same apparatus to the right of the line C–D.

FIG. 16 is a view in elevation, with cross-section of the apparatus in FIG. 15a, this section being taken along the line XVI—XVI in FIG. 15a.

FIG. 17 is a section of one of the ends of the rolling table showing a third arrangement of the driving mechanism moving this table forward.

FIG. 18 is a vertical section of a variant of part of the rolling table, this section being taken in the axis of a shoe.

FIG. 19 is a horizontal section corresponding to the line XIX—XIX in FIG. 18.

Figure 1A:
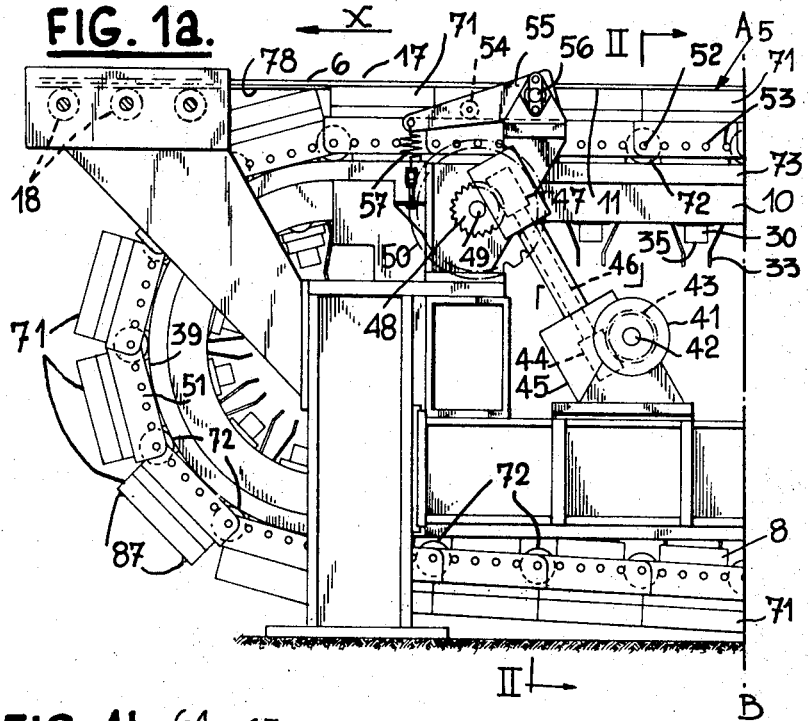
FIG. 1a is a side view of part of a first embodiment of the apparatus in accordance with the invention, to the left of line A–B.
Figure 1B:
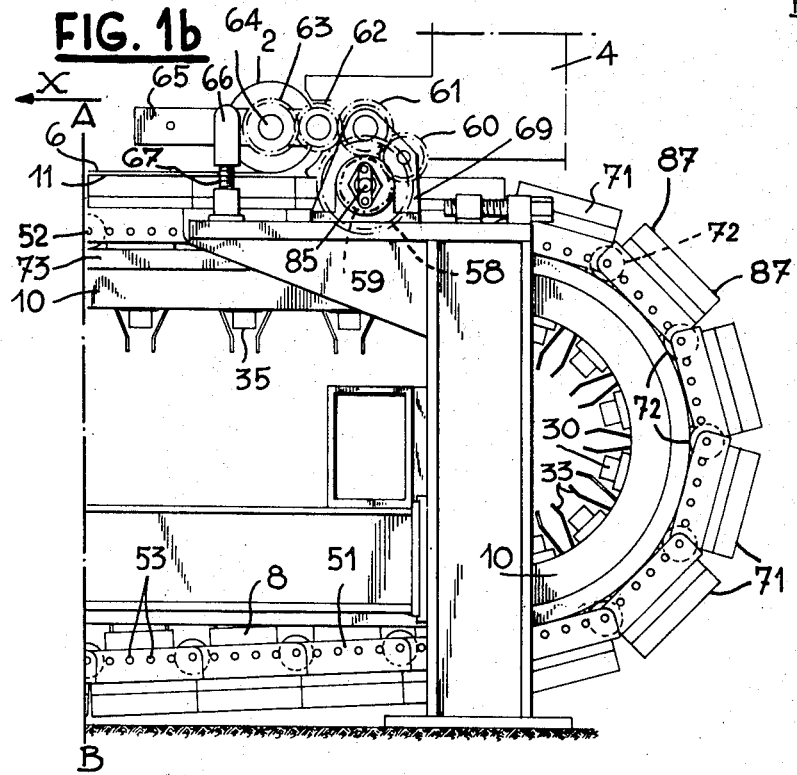
FIG. 1b is a side view of part of the same apparatus, situated to the right of line A–B.

The apparatus shown in FIGS. 1 to 4 comprises a rotary roller 2 which presses the glass 3 emerging from a furnace 4 on a mobile support formed by a rolling table 5 moving forward continuously in the direction of the arrow X. This rolling table passes at a distance from the rotary roller 2 equal to the thickness of the sheet of glass 6 to be produced. The table comprises essentially two successive sets of shoes 7 (see FIG. 5). In each set these shoes are driven by interarticulated carriages 8. These carriages are provided with rollers 9 which roll on guides 10 having a straight part beyond a point 11 where the rolling table moves away from the above-mentioned roller. In each set of shoes there are provided transverse grooves 12. These grooves 12 are deeper than the height of the ribs which could be produced by forcing glass 3 into grooves formed in a rolling roller in the case where a grooved rolling roller would be used. These transverse grooves 12 are provided in the rolling table 5 between the facing surfaces 13 (FIGS. 6 and 7) of the shoes.

The shoes are mounted on articulated carriages 8 in such a way that they can be removed from contact with the glass sheet. This removal is effected over a depth at least equal to the depth of the transverse grooves 12 formed between successive shoes of each set. It is in a lowered position that the shoe 7 is represented in its entirety in FIG. 7.

Metal sheets 14 (FIGS. 6 and 7) whose upper edge 15 forms the bottom of the grooves 12, are mounted in front of the shoes on the corresponding carriages 8. They prevent the lowering of transverse ribs 16 of the glass sheet 6 formed by the forcing of the glass into the grooves 12 due to the roller 2, when the shoes 7 are removed from the sheet 6.

Means for removing the shoes from the glass sheet 6 to a level substantially equal to that of the upper edge 15 of the metal sheets 14 are provided at a position such as 17 (FIG. 3a) through which the shoes pass before the corresponding carriages leave the straight parts of the guides 10. The length of the straight parts is such that when the shoes are removed from the ribbed glass sheet, the latter has cooled sufficiently by contact with the shoes so that it is sufficiently rigid to maintain its shape until it has reached a conveyor 18 situated in front of the above-mentioned straight parts. The conveyor may consist of rollers, for instance.

Between the two adjacent sets of successive shoes 7, are provided longitudinal grooves 19 (FIG. 5) corresponding to the longitudinal ribs to be produced in the glass sheet. These longitudinal grooves 19 are provided between the upper parts of the shoes of one set and the shoes of the adjacent transverse set. Longitudinal metal sheets 20 (FIG. 8) similar to the transverse metal sheets 14, each have an upper edge which forms the bottom of the longitudinal grooves 19. The metal sheets 20 are fixed to adjacent carriages, for instance by means of pins 21 which pass through and engage the carriages.

Each shoe 7 is fixed on a central rod 22 (FIG. 6) which can slide in a sleeve 23, but which is lockable therewith in a manner which will be described later. This sleeve which likewise occupies therefore a central position in relation to the shoe, slides axially in the corresponding carriage 8 and is permanently biassed by a spring 24 in such a way as to urge the shoe 7 away from the associated carriage 8. The effect of this spring is to keep the upper surface of the shoe 7 in a position at which it is effective in the formation of the sheet of glass.

The sleeve 23 can slide against the action of the spring 24 under the control of a fixed cam 25 associated with removal from the mould (FIGS. 6 and 7) when the rollers 26 carried by a mobile fitting 27 mounted on the sleeve 23 encounter the fixed cam 25 during the forward feed movement of the shoes.

When the rollers 26 have travelled over the cam 25, the shoe occupies a position as represented in FIG. 7. In this position the upper surface of the shoe is substantially at the level of the upper edge of the metal sheets which support the sheet of glass during its removal from the mould.

The central rod 22 is rendered axially integral or locked with the sleeve 23 by balls 28 (FIGS. 6 and 6a) whose diameter is slightly greater than the tickness of the sleeve and which are arranged in holes therein. The ball 28 partly penetrate into a groove 29 in the rod 22. They are prevented from escaping from this groove by a ring 30 held in the position shown in FIG. 7 by a spring 31 interposed between the mobile fitting and a flange 32 of the ring. Due to these locking means the shoe 7 therefore follows the axial movement of the fitting 27 and the sleeve 23. If, for any reason, it is desired to raise a shoe 7 from the corresponding carriage, the locking means can be overcome or inactivated by the following operation.

In hooks such as 33 fixed to the mobile fitting 27 by bolts 34, is placed the pivot of a lever which does not form part of the installation and pressure is applied to this lever in such a way that one of its ends rests against the lower surface 35 of the ring 30 and raises this ring into a position such as that shown in FIG. 9. In this position an annular groove 36 is aligned with balls 28 in such a way that they can escape from the groove 29. The result is that the central rod 22 is no longer locked with the sleeve 23.

It can be seen in FIG. 6a that the holes of the sleeve 23 each have, towards the interior of the sleeve, a flange 119 which prevents the balls from coming out of these holes when the rod 22 is removed.

Figure 10:
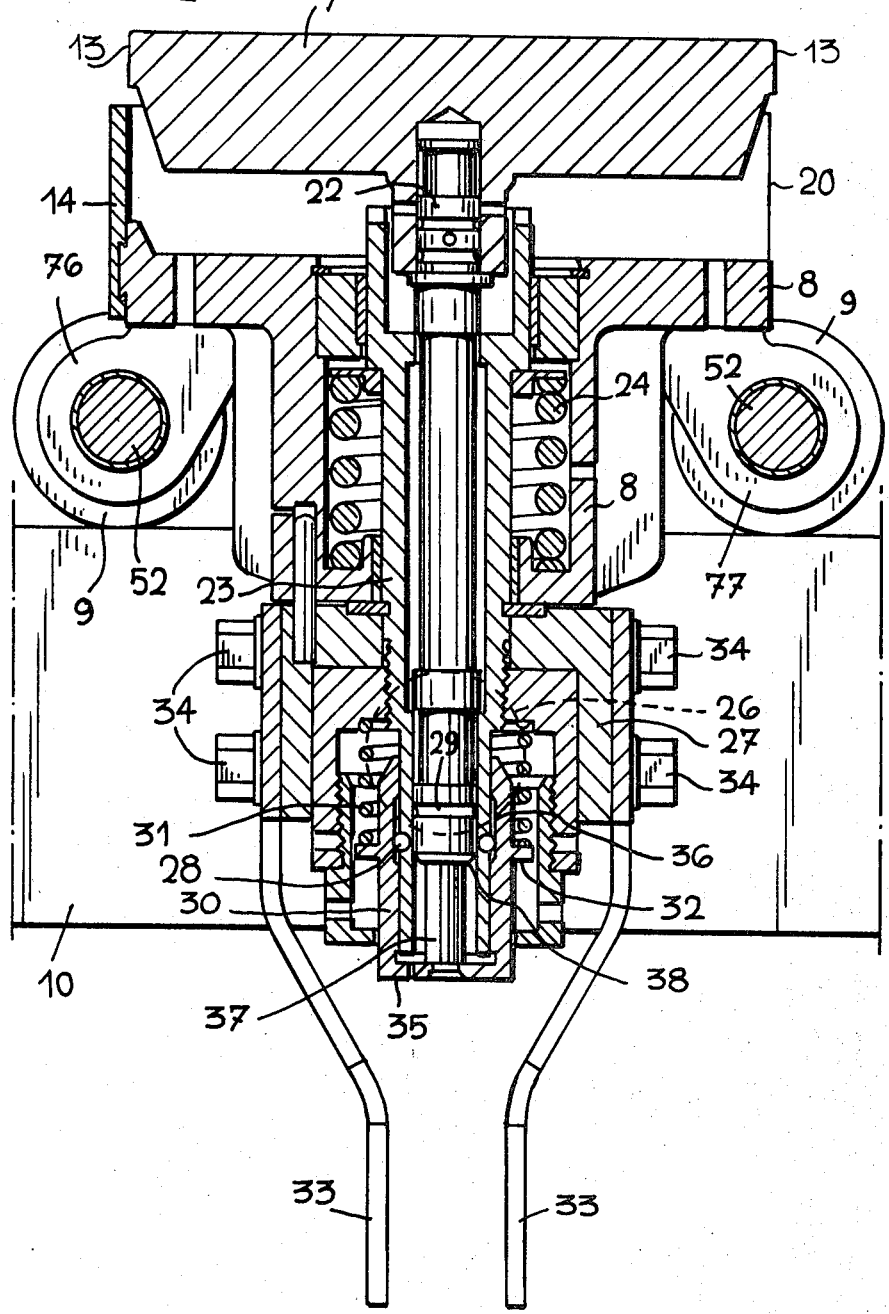
FIG. 10 is a section similar to that in FIGS. 6 and 7 showing a position of the shoe permitting it to be raised.
Figure 16:
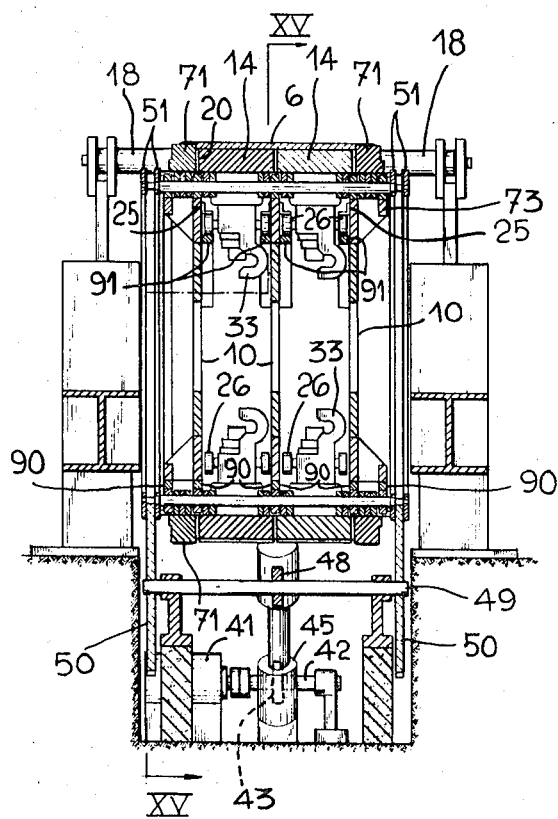

In this same position a peg 37 fixed to the bottom 35 of the ring 32 come to rest against the lower surface 38 of the central rod 22. Thereby, if the lever, one end of which is against the lower surface 35, is moved further, the rod 22 and the shoe carried by it are raised. The rod and shoe can thus be brought into a position such as that shown in FIG. 10. It is then possible to take the shoe 7 and raise it at the same time as the rod 22 which is carrying it. It is also possible if the shoe is square, as shown in FIG. 5, to rotate it through 90° and to use decorative motifs or grooves in any direction which it presents in its upper surface to obtain in the sheet of glass differently oriented designs.

The shoes 7 shown diagrammatically in FIG. 5 have grooves 120 parallel to the grooves 12 formed between the successive shoes of a given set, said grooves 120 having a depth equal to that of grooves 12. To simplify FIG. 5 the grooves 120 have however been shown diagrammatically by a single line.

The different shoes 10 also have grooves 121 parallel to the adjacent sets of the same depth as the grooves 19 between the sets. To simplify the figure the grooves 121 are likewise represented by a single line. Of course the grooves formed in the shoe may have a different depth from those between the shoes.

When a shoe has been brought to the position 17, in its position of removal from the mould (shown in FIG. 7), the carriage which carries it may begin to roll on a circular guide 39 (FIG. 1a and 3a), without having to fear that this shoe might abut against the transverse rib 16 of the sheet of glass which has been formed in front of it. After a certain amount of travel the shoe resumes, in respect of the carriage which it entrains, a position similar to that which it occupies in FIG. 6.

Figure 3A:
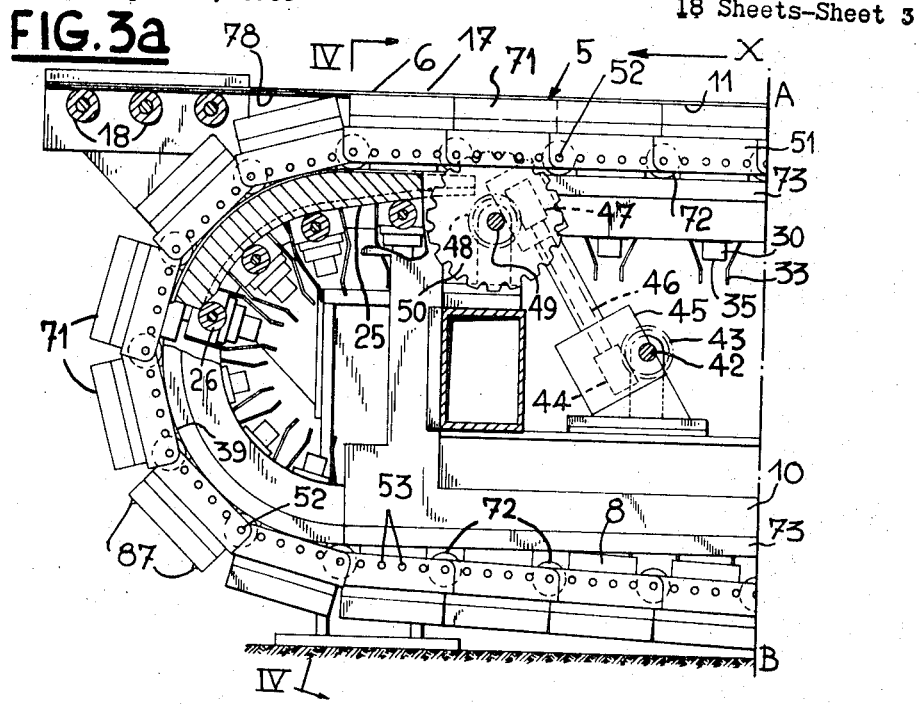
FIG. 3a is a side view of the part of the apparatus represented in FIG. 1a, in part longitudinal section as taken along line III—III in FIG. 4, and partly broken away to show the cam associated with removal from the mould.

In FIG. 3a there s shown a roller 26 which has just left the cam 25 and allows the corresponding shoe to resume such a position in the carriage.

Figure 3B:
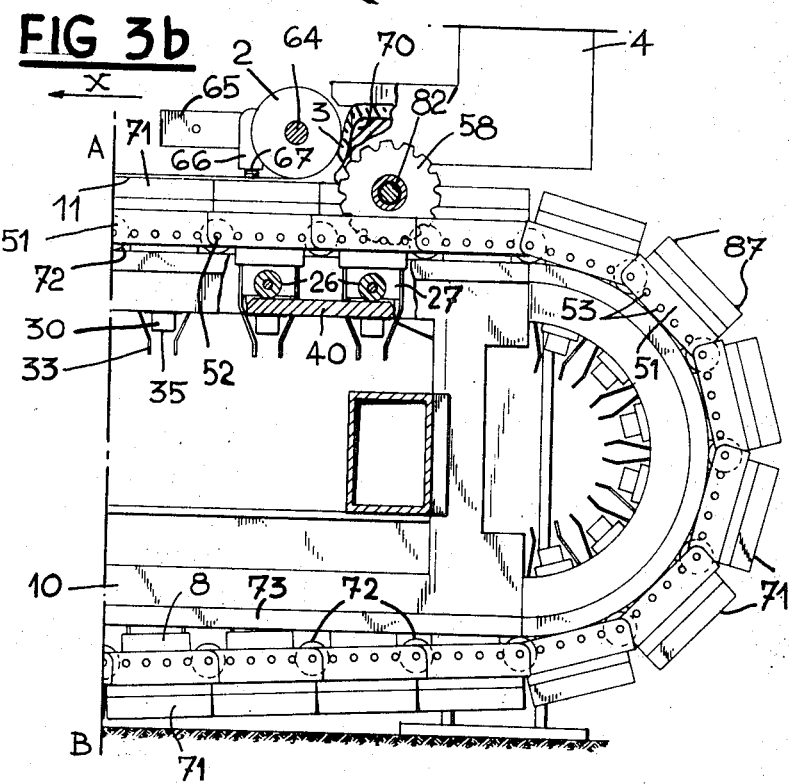
FIG. 3b is a side view of the part of the apparatus shown in FIG. 1b as taken along line III—III in FIG. 4 and partly broken away to show the support arrangement for the carriages at the position where the glass is pressed on the shore.

In FIG. 3b it can be seen that below the point 11 where the glass 3, which has just emerged from the furnace 4, is pressed by the roller 2 against the supporting surface of the roller table 5, the shoes are prevented from being pushed downwards, against the action of the springs 24 by the fact that the rollers 26 of the corresponding mobile fittings 27 roll on a guide 40 parallel to the guides 10.

The rolling table 5 is driven in the direction of the arrow X by means of a motor 41 (FIGS. 1a and 2) which, through shaft 42 actuates worms 43 meshing with screws 44 contained in casing 45. These screws are keyed on shafts 46 carrying other screws 47 engaging with worm wheels 48. These latter gearwheels are keyed on a shaft 49 carrying sprockets 50 meshing with links 51 of endless chains arranged on either side of the rolling table. The links of these endless chains are interarticulated by pivots 52 which are the same as those which are used for the articulation of successive pairs of carriages arranged side by side in the juxtaposed sets of shoes. The links 51 of the above-mentioned chains each carry intermediate rollers 53 (FIGS. 3a and 8).

It can b eseen in FIG. 3a that the driving sprockets 50 are arranged below the upper straight sides of the above-mentioned endless chains. To prevent the links forming these chains from being repelled upwards because of the vertical component of the driving action exerted obliquely by the teeth of the sprockets 50 on the intermediate rollers 53 or on the pivots 52, it is arranged that the links shall be pushed towards the sprockets 50 by means of rollers 54 (FIG. 1a) carried by levers 55 pivoting at 56 and biased by springs 57.

In FIGS. 1b, 2, 3b and 4 a mechanism is likewise shown by which it is possible to set the rotation of the roller 2 to a speed such that its peripheral speed is always equal to the forward feed speed of the rolling table 5. For this purpose, gearwheels 58 mesh with the rollers 53 of the links 51 and the pivots 52 between these links. These gearwheels are integral with other gearwheels 59 which engage with further gearwheels 60. The movement of wheels 60 is transmitted by gearwheels 61 and 62 to gearwheels 63 keyed on the shaft 64 of the roller 2. This shaft is carried by levers 65 which rest by means of forks 66 on adjustable vertical position stops 67, said levers 65 being pivotable around the same axis as that of the gearwheels 62. The vertical position of the stops 67 determines the thickness of the sheet of glass 6 pressed between the roller 2 and the rolling table 5.

The bearings 68 of the shaft 64 are carried by slides 69 movable in the direction of forward feed of the rolling table an dare thereby adjustable and can adapt the distance between the roller 2 and an overflow chute 70 to the rate of flow of glass necessary for the production of the sheet of glass required. This slide carries at the same time the mechanical connecting means between the endless chains and the rotary roller, by which the roller is entrained at the same peripheral speed as the speed of forward feed of the rolling table.

The glass which is pressed by the roller 2 on the rolling table extends transversely over a width which is greater than that of the sheet of glass to be produced on the rolling table formed by the juxtaposition of two sets of shoes, such as 7. The glass, which extends beyond these shoes, is collected by side carriages 71 (FIGS. 2, 4 and 8) which are likewise interarticulated around pivots 52. The side carriages are mounted rollers 72 similar to the rollers 9 and rolling on lateral guides 73 similar to the guides 10. The connection between the carriages 71 is obtained by means of lugs 74 integral with one of the carriage and a lug 75 integral with the following carriage and located between the lugs 74.

Figure 2:
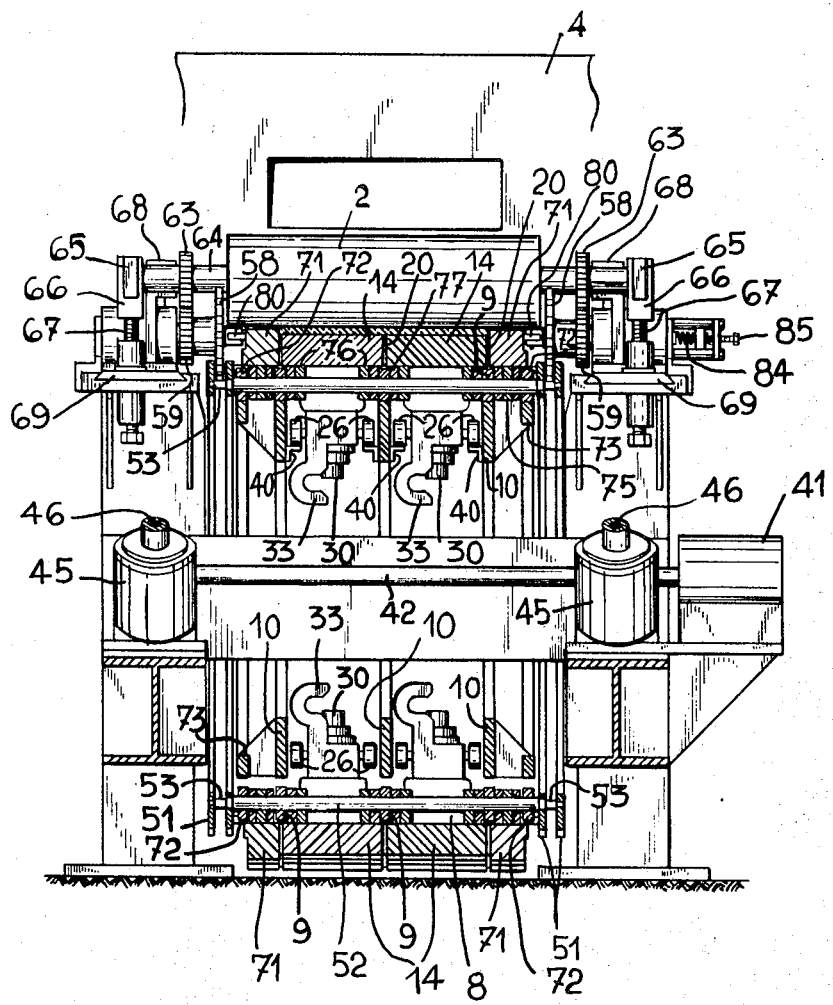
Figure 4:
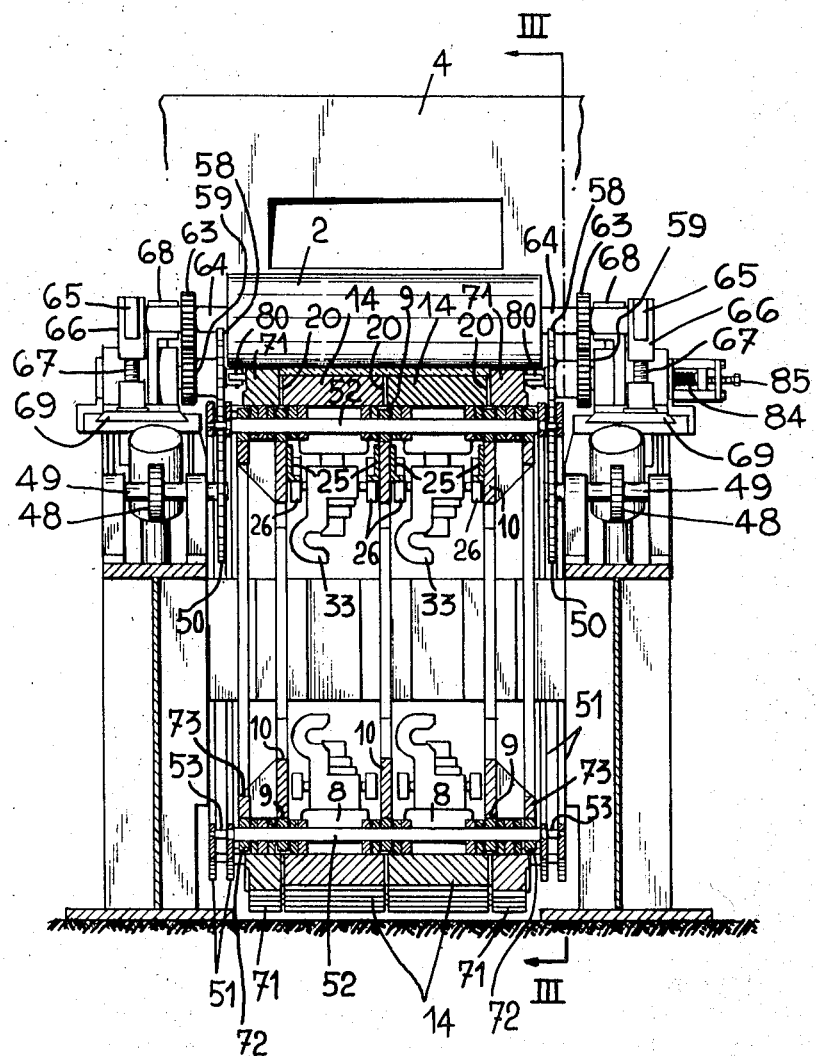

In FIGS. 2 and 4, it can be seen that the successive carriages 8 of a given set are articulated by means of lugs 76 integral with one of the carriages and lugs 77 integral with the following carriage.

Between the carriages 71 and the adjacent shoes 7, metal sheets are arranged similar to the longitudinal sheets 20 between the adjacent sets of shoes 7.

It can be seen in FIG. 11 that between the shoes 7 and the adjacent side carriage 71, a longitudinal rib 78 has been formed and that the glass has flowed at 79 beyond this rib onto the carriage 71. The left-hand carriage 71 comes into contact with a roller 80 with a vertical axis carried by a fork 81 attached to rod 82. The axial position of this rod is adjustable by means of a screw 83. The right-hand side carriage likewise comes into contact with a roller 80 with a vertical axis carried by a fork 81. This latter fork is attached to a rod 82' permanently biased towards the rod 82 by a spring 84 the compression of which can be adjusted by means of a screw 85. The effect of this spring is to keep the different parts of the rolling table 5 in contact with one another and the alignment of the table can be controlled by means of the screw 83.

It can also be seen from FIG. 11 that the illustrated one of the side carriages 71 has a cutter 86 extending parallel to the longitudinal axis of the rolling table. The effect of this cutter is to separate the marginal zone 79 of the glass sheet from its central zone, at the point where the hot glass is forced into the grooves of the rolling table by the rotary roller 2. The side carriages 71 situated on the two sides of the central carriages 8 are provided with longitudinal cutters of this kind as can be seen in FIG. 5.

Cutters 87 arranged transversely to the longitudinal direction of the rolling table extend over the whole width of this table as can be seen in FIGS. 5 and 13. They are carried by transverse members 88 (FIGS. 12, 13 and 14) which are fixed to the side carriages 71 by screws 89. The effect of these cutters is to cut the sheet of glass through practically its entire thickness at the point where the hot glass is pressed on the rolling table by the rotary roller 2. As can be seen more clearly from FIG. 12 these transverse cutters 87 are arranged near the metal sheets 14.

In FIG. 15a, it can be seen that the driving mechanism causing the rolling table to move forward is arranged below the lower side of the endless chains. The sprockets 50 actuate links 51 which are applied against straight guides 90 substantially oriented along the tangent to the circular guides 39 on which the rollers of the carriages roll between the upper side and the lower side of the rolling table. These straight guides 90 prevent the links of the chain from being pushed upwards when the pivots 52 or the intermediate rollers 53 are subjected to the thrust of the sprockets 50.

It can also be seen from FIGS. 15a and 15b, that the rollers 26 attached to the mobile fittings 27 roll on a straight guide 91 which extends from at least a position where the glass is pushed against the rolling table by the roller 2 to a point slightly in front of that where the removal from the mould is effected by the cam 25. This straight guide 91 therefore prevents any descent of the shoes even if the springs such as the spring 24 in FIG. 6 should be weakened.

From FIG. 17 it can be seen that the links of the endless chain receive the driving thrust of sprockets 50 the axes of rotation of which are substantially at the same level as the centers 92 of the circular guides 39 on which the carriages roll when passing from the upper side to the lower side of their rolling table. The axes of the intermediate rollers 53 of each link are aligned along an arc concentric with the circular guide 39 when the carriages roll on the guides.

In the embodiment of the rolling table shown in FIG. 18, the rod 22 carrying the shoe 7 is so mounted as to be able to be released from the shoe. For this purpose the rod 22 has at its end, nipples 93 supported against an interior flange 94 of a cavity 95 of the shoe. This flange 94 has slots 96 through which it is possible to pass the nipples 93 when these have been brought facing the slots by rotation in the direction of the arrow Y in FIG. 19. In this latter angular position it is possible to remove the shoe 7 and leave the rod 22 free in the sleeve 23. In the working position, the nipples 93 abut against pegs 97 fixed in the shoe 7.

The shoe 7 is held against the upper end of the sleeve 23 by a set of resilient rings 31' serving the same function as the return spring 31 in FIG. 6. The resilient rings 31' are interposed between a flange 98 of the sleeve 23 and a ring 99 retained by a nut 100 screwed to the lower end of the central rod 22. The rod 22 terminates in a polygonal section 101 facilitating its rotation after an additional compression of the elastic rings 31' the effect of which is to interrupt the contact of the nipples 93 with the interior flange 94 of the shoe.

It can also be seen from FIG. 18 that the metal sheet 14, of which the upper edge 15 forms the bottom of the transverse groove 12, has a lip 102 which is held against the carriage 8 by a screw 103. After having removed the shoe 7 in the manner described above in connection with FIGS. 18 and 19, it is therefore easily possible to substituted one metal sheet for another in order to modify, for instance, the depth of the groove 12.

It can also be seen from FIG. 18 that the carriage carries a transverse bar plate 104 provided with a lip 105 held on the carriage by a screw 106. This plate is designed to prevent the penetration of glass offcuts between the shoe 7 and the bottom of the seating 107 provided for the shoe in the carriage 8.

Figure 20:
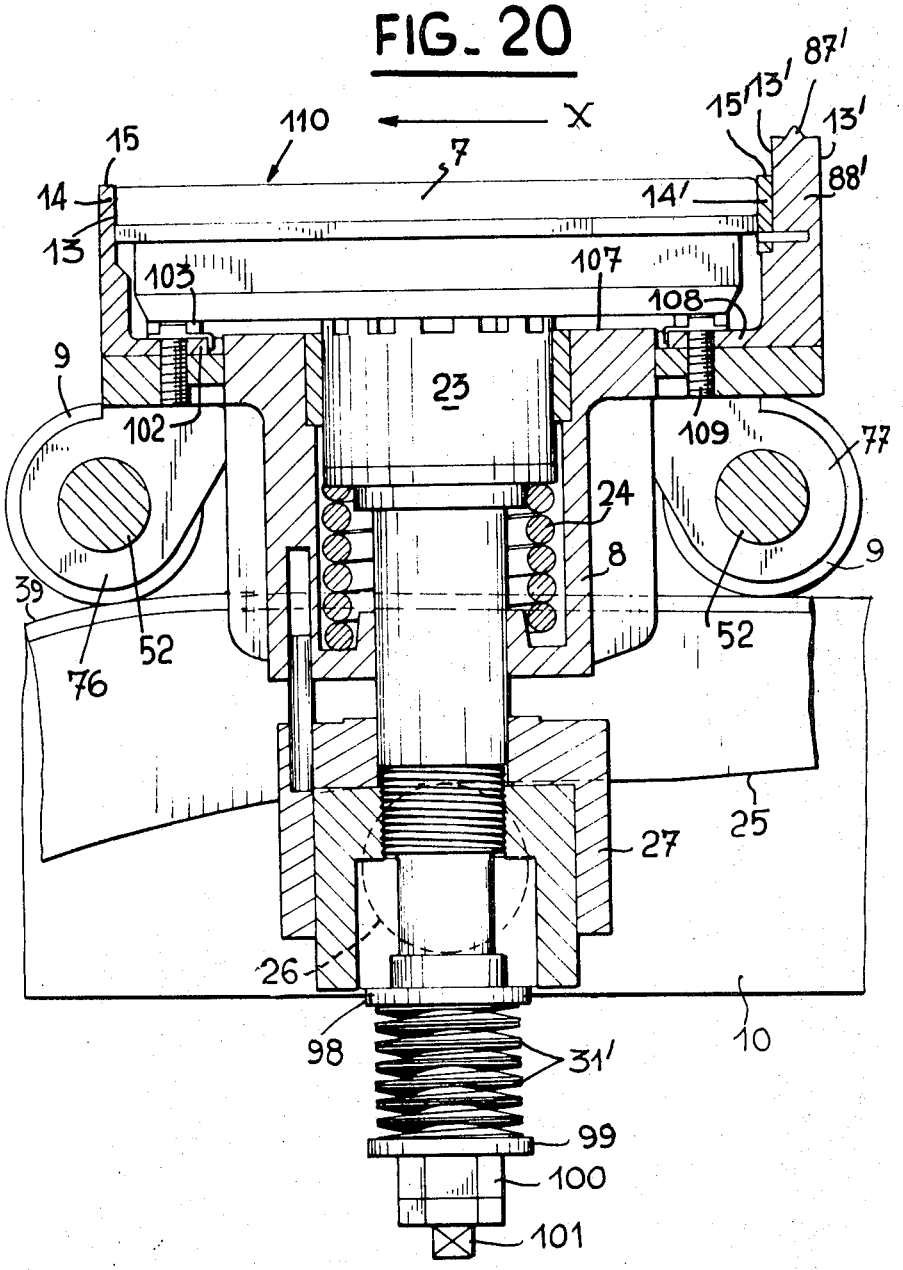
FIG. 20 is a vertical section in the variant of the rolling table represented in FIG. 18, at the point at which removal from mould has just been effected part of the shoe and the components with which it is integral being shown in elevation.

In FIG. 20 the shoe 7 is seen in the lowered position removed from the sheet 6 as determined by the position of the roller 26 of the cam 25. In this position, the upper surface of the shoe is substantially at the level of the upper edge 15 of the metal sheet 114 and the upper edge 15' of a metal sheet 14' fixed on a member 88' carrying a transverse cutter 87'. This member 88' has a lip 108 which is held against the carriage 8 by a screw 109. The upper part of the member 88' has two surfaces 13' similar to the surfaces 13 of the shoes 7. The result is that the transverse cutter 87' is adjacent to two transverse slots very near to one another, one being formed above the metal sheet 14' which it carries in front of it and the other being formed above the metal sheet 14 of the following shoe. Consequently when the glass sheet is cut transversely by this cutter 67' glass offcut similar to that designated by 6' in FIG. 12 which is comprised between the two cuters 87 in this figure does not exist between the two transverse ribs of the sheet of glass formed in the two abovementioned adjacent slots. To avoid the offcut it is necessary for the carriage 8 in FIG. 20 to asymmetrically carry assembly which is wider than the assembly carried by the carriage 8 in FIG. 18. The excess width of the assembly in question in FIG. 20 is equal to the thickness of the metal sheet 14' behind the shoe and the member 88' behind this metal sheet. The sum of these two thicknesses is made equal to half the pitch of the sprockets which drive the chain. The assembly 14, 7, 14' and 88' overlaps rearwards the axis of the pivot of articulation 52 between this carriage and the carriage behind it.

Figure 21:
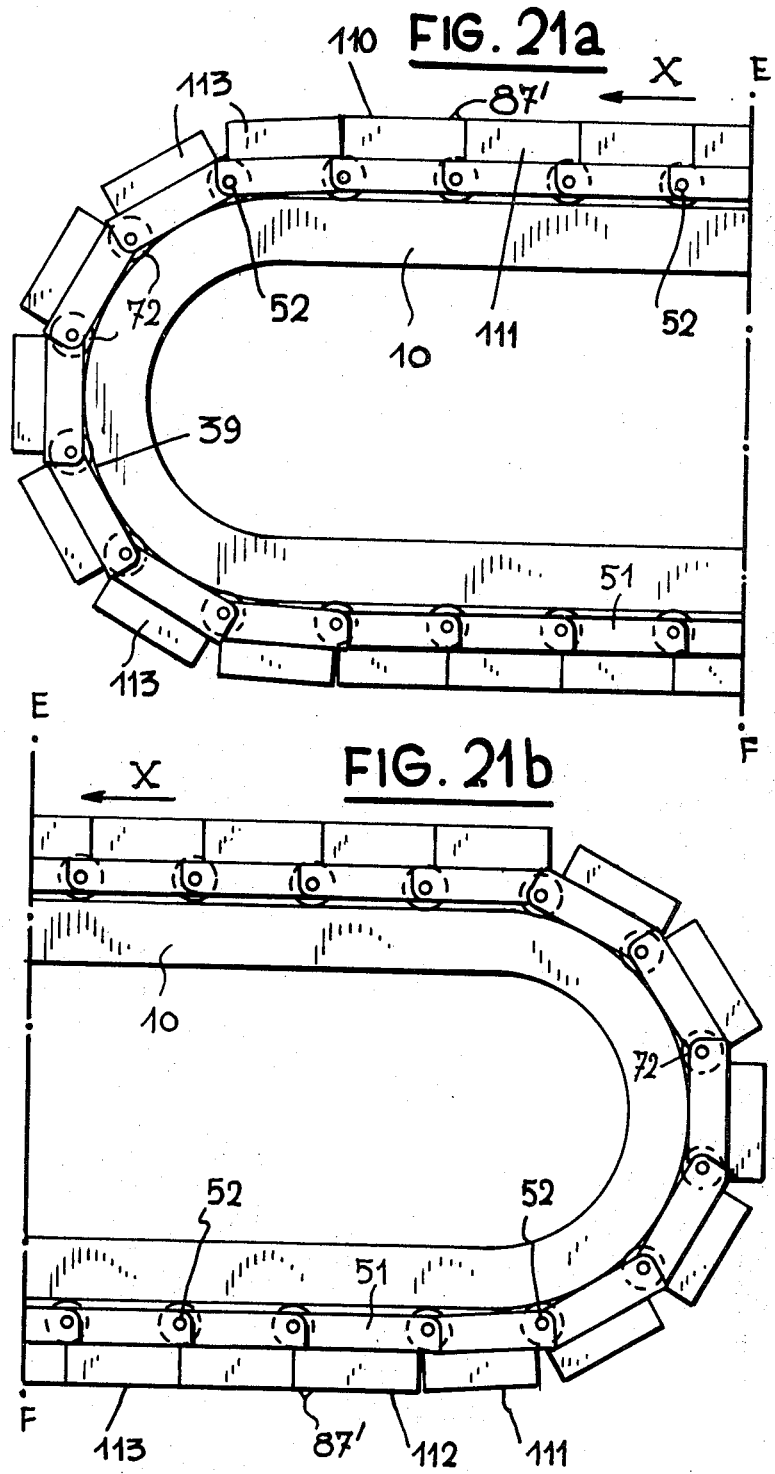
FIG. 21a is a view in elevation of the part of another embodiment of the apparatus in accordance with the invention, situated to the left of a line E–F.
FIG. 21b is a view in elevation of the part of the same apparatus situated to the right of the line E—F.

In FIG. 21a, there is shown diagrammatically at 110 a carriage which carries an assembly asymmetrically arranged like that in FIG. 20. Behind this assembly, the rolling table has a set of carriages 111 having between their pivots 52 the same distance as that between the pivots 52 of the carriage 110 but whose upper parts, formed like the upper part in FIG. 18, are arranged behind the axes of the pivots 52 in respect to the case in the said FIG. 18. The amount of rearward offset of the assembly at the upper part of the carriages 111 is equal to half the pitch of the driving sprockets.

At the point where it is desired to make another transverse cut in the glass sheet, a carriage such as that designated by 112 in FIG. 21b, is provided behind the carriages 111. The distance between the axes of the pivots of articulation of this carriage is equal to the distance between the axes of the pivots of articulation of the carriages 111 plus a length equal to the pitch of the chain driving sprockets. This carriage 112 comprises, like the upper part of the carriage 110 shown in detail in FIG. 20, a sheet 14, a shoe 7, a metal sheet 14' and a member 88' carrying a cutter 87'. The result is that the rear surface of this assembly passes through the axis of the pivot or articulation behind the carriage 12. Behind this, the rolling table comprises a group of carriages 113 identical with those shown in FIG. 18. The end of this group is formed by the carriage 113 which is in front of the carriage 110 in FIG. 21a. Because the links of the driving chain corresponding to the longest carriage 112 are longer than the other links of the chains, by a length equal to the pitch of the driving sprockets, it is sufficient to mount on the links of the carriage 112 an intermediate roller of the same kind as the rollers 53 in FIG. 8, in addition to the number of rollers mounted on the other links.

Figure 22:
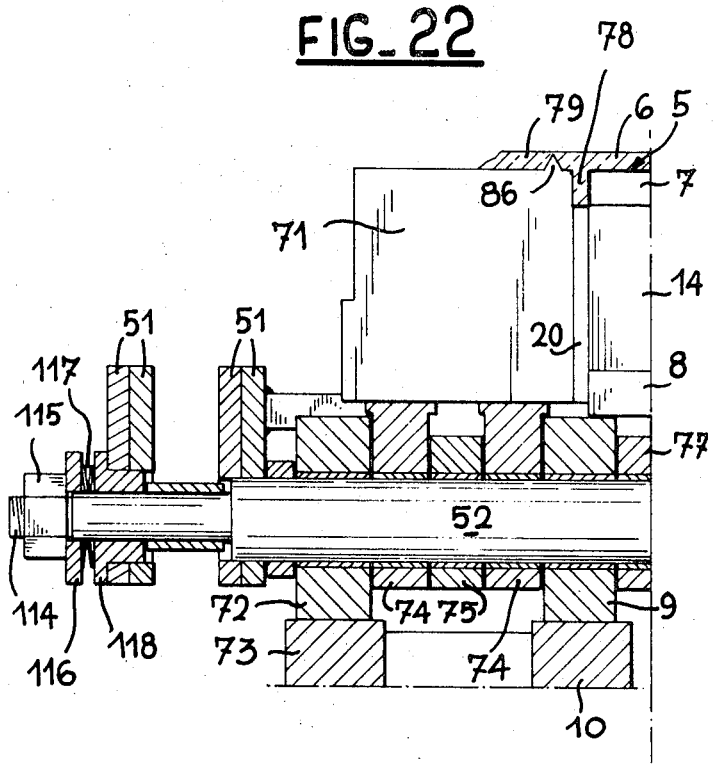
FIG. 22 is a cross-section passing through the axis of a pivot, in a part of a variant of the apparatus in accordance with the invention.

In FIG. 22 it can be seen that one of the ends of a pivot or articulation 52 between successive carriages of the rolling table has a threaded end 114 on which is screwed a nut 115 supported against a ring 116. This latter places under compression the resilient rings 117 supported in turn against a ring 118. This latter pushes against the links 51 and the different articulation lugs of the adjacent carriages towards the other end of the pivot which is fitted in an identical manner to that shown.

The elastic rings 117 thus replace the elements 80 to 85 in FIG. 11.

Figure 23:
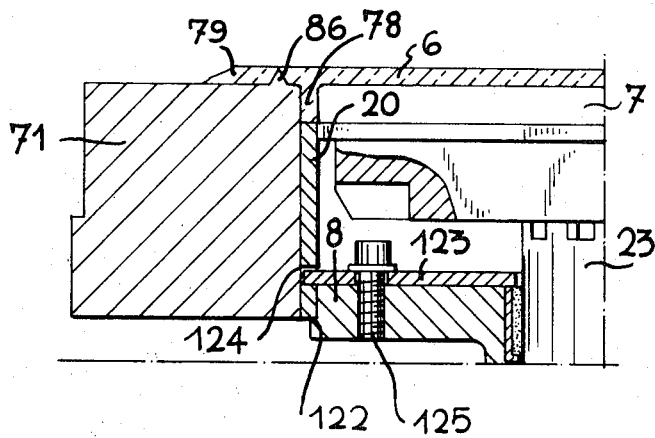
FIG. 23 is a cross-section showing another method of fixing a longitudinal metal sheet on a carriage.

In FIG. 23 is shown a longitudinal shet 20 applied against a flange 122 of the carriage 8 by a clamp 113 engaged in a recess 124 in the sheet. The clamp is held in position by a screw 125.

Figure 24:
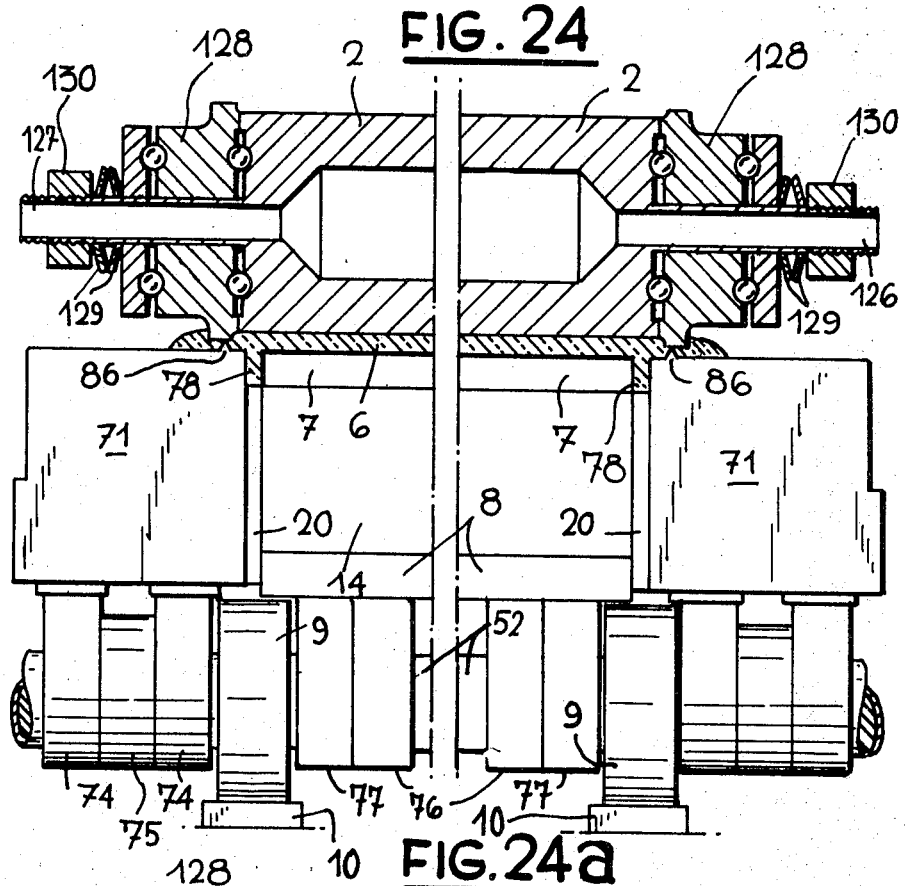
FIG. 24 is a cross-section in a variant of the rotary roller forcing the glass into grooves of the rolling table and idle rollers mounted at the ends of this roller.

In FIG. 24 is seen a rotary roller 2 cooled by a water circulation system fed from a duct 126 and discharged through a duct 127. This roller presses the glass against the rolling table. The sheet of glass 6 formed in this way is limited in width by the cutters 86 which pass almost in contact with idle rollers 128 mounted at the ends of the roller 2. These rollers are co-axial with the roller 2 and are pressed against roller 2 by springs 129 tensioned by nuts 130 screwed on the ducts 126 and 127 which acts as bearings for the roller 2. The rollers 128 have a diameter which is equal to the diameter of the roller 2 increased by a little more than the distance between this roller and the rolling table 5. Consequently the cutters 86 should only be able to penetrate into the glass sheet 6 by a little less than its thickness. Experience has shown that this arrangement is more advantageous than when the cutters 86 are able to penetrate into the glass through the entire thickness of the sheet.

It has also been found that it is advantageous to progressively reduce the width of that part of the idle roller 128 which is at a greater distance from the axis of rotation than the rotary roller 2.

Figure 24A:
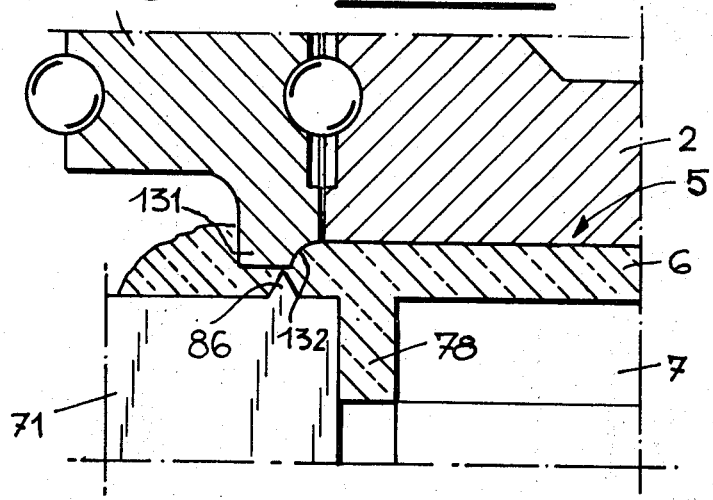
FIG. 24a represents on a larger scale a part of FIG. 24.

The said part therefore appears in cross-section in the form of the heel 131 (FIG. 24a) under which moves the cutter 86. Preferably the inner surface 132 of this heel is concave.

Of course the invention is not exclusively restricted to the forms of embodiment described above with reference to the attached drawings.

It has already been indicated that the length of the straight part of the guides 10 is such that when the shoes are removed from the ribbed sheet of glass, the latter is sufficiently rigid to retain its shape before reaching the conveyor 18. It can be understood that if it would be advantageous, in view of a subsequent heat treatment, to remove the sheet from the mould when it is at the highest possible temperature compatible with the absence of deleterious deformation, it is possible to effect the removal at a temperature greater than that which is normally selected when the production of the sheet is to be followed by cooling. The distance between the position at which the glass is pressed in the rolling table and the removal-from-mould position varies from one particular application to another, not only according to the temperature that the sheet of glass has to undergo after removal from the mould, but also according to the initial temperature of the glass, its composition and the thickness of the sheet, for instance.

It likewise goes without saying that the scope of the invention is not restricted to the case in which the rolling table follows a straight path immediately after being passed under the rotary roller, although such a path appears the normal one. It is obvious that it is possible, for instance, to provide for the path of the upper side of the endless rolling table, guides in the form of arcs of a circle. It is sufficient, on the one hand that the front and rear walls of the shoes are inclined in relation to one another in such a way that during the trajectory following the arc they remain close together with edges touching between themselves or with the metal sheets forming the bottom of the grooves when such sheets are used and, on the other hand, that the circular guides on which the carriages travel while they are passing from one side to the other may have a radius of curvature which is less than that of the curved guide of the upper side.

The surface of each shoe in contact with the sheet of glass may be flat or curved concentrically to the arc of the guide of the upper side according to whether it is desired to obtain a glass sheet with a succession of flat surfaces having an angle between them or a sheet with a constant curvature.

What is claimed is:

1. A method for the production of sheets of glass having at least one surface with ribs, said method comprising passing molten glass between a rotary roller and a spaced advancing surface having grooves therein to cause the roller to force molten glass into the grooves and produce a sheet of glass of desired thickness on said surface with ribs extending into the grooves, moving the surface away from the sheet while temporarily supporting the ribs at a distance sufficiently remote from the roller such that the glass is cooled and hardened thereat, and engaging the sheet at a location beyond the zone where the surface is lowered to support and advance the hardened sheet with the ribs thereon.

2. A method as claimed in claim 1, comprising rotating the roller at the same peripheral speed as the speed of advancement of the surface.

3. A method as claimed in claim 1, comprising lowering the surface by sections in said zone such that the surface is substantially straight and level between said zone and the roller.

4. A method as claimed in claim 1, comprising cutting the glass sheet to prescribed width between the roller and the advancing surface.

5. A method as claimed in claim 1, wherein said surface is caused to traverse an endless path composed of generally upper and lower horizontal portions and end circular portions, the glass being advanced on the surface during the passage thereof along the upper horizontal portion, said sections of the surface supporting the glass sheet being lowered therefrom prior to reaching an end circular portion.

6. A method as claimed in claim 1, wherein both longitudinal and transverse grooves are formed in the surface so that both longitudinal and transverse ribs are formed on the glass sheet.

7. A method as claimed in claim 5, wherein said sections are lowered uniformly away from the glass sheet in said zone after which they pass around an end circular portion of the path.

References Cited

UNITED STATES PATENTS 3,459,525  11/1969  Discry _____ 65—245

ARTHUR D. KELLOGG, Primary Examiner

U.S. Cl. X.R.

65—97, 100, 176, 245, 255, 256